United States Patent
Foster-Pegg

[15] 3,705,491
[45] Dec. 12, 1972

[54] JET ENGINE AIR COMPRESSOR

[72] Inventor: Richard W. Foster-Pegg, 101 Fourth Ave., Warren, Pa. 16365

[22] Filed: June 30, 1970

[21] Appl. No.: 51,168

[52] U.S. Cl. .....................60/39.55, 60/242, 60/262
[51] Int. Cl. ...........F02c 7/00, F02g 1/00, F02k 1/02
[58] Field of Search......................60/242, 262, 39.55

[56] References Cited

UNITED STATES PATENTS

| | | | |
|---|---|---|---|
| 3,199,293 | 8/1965 | Starkey | 60/39.28 |
| 3,213,288 | 10/1965 | Blaekaby | 60/39.28 |
| 2,693,674 | 11/1954 | Anxionnaz | 60/262 |
| 2,819,732 | 1/1958 | Paetz | 60/262 |
| 2,847,825 | 8/1958 | Spears | 60/39.55 |
| 3,108,767 | 10/1963 | Eltis | 60/262 |
| 3,196,609 | 7/1965 | Ingram | 60/262 |

OTHER PUBLICATIONS

" Power Engineering" Feb., ' 65 by Strimbeck et al.

*Primary Examiner*—Laurence M. Goodridge
*Assistant Examiner*—Ronald B. Cox
*Attorney*—William A. Drucker

[57] ABSTRACT

A gas turbine jet engine is modified to act as an air compressor by removing the propulsion nozzle to increase the expansion ratio across the driving turbine and by injecting steam generated in the jet exhaust into the driving turbine to restore volume flow lost by removal of compressed air from the compressor.

1 Claim, 1 Drawing Figure

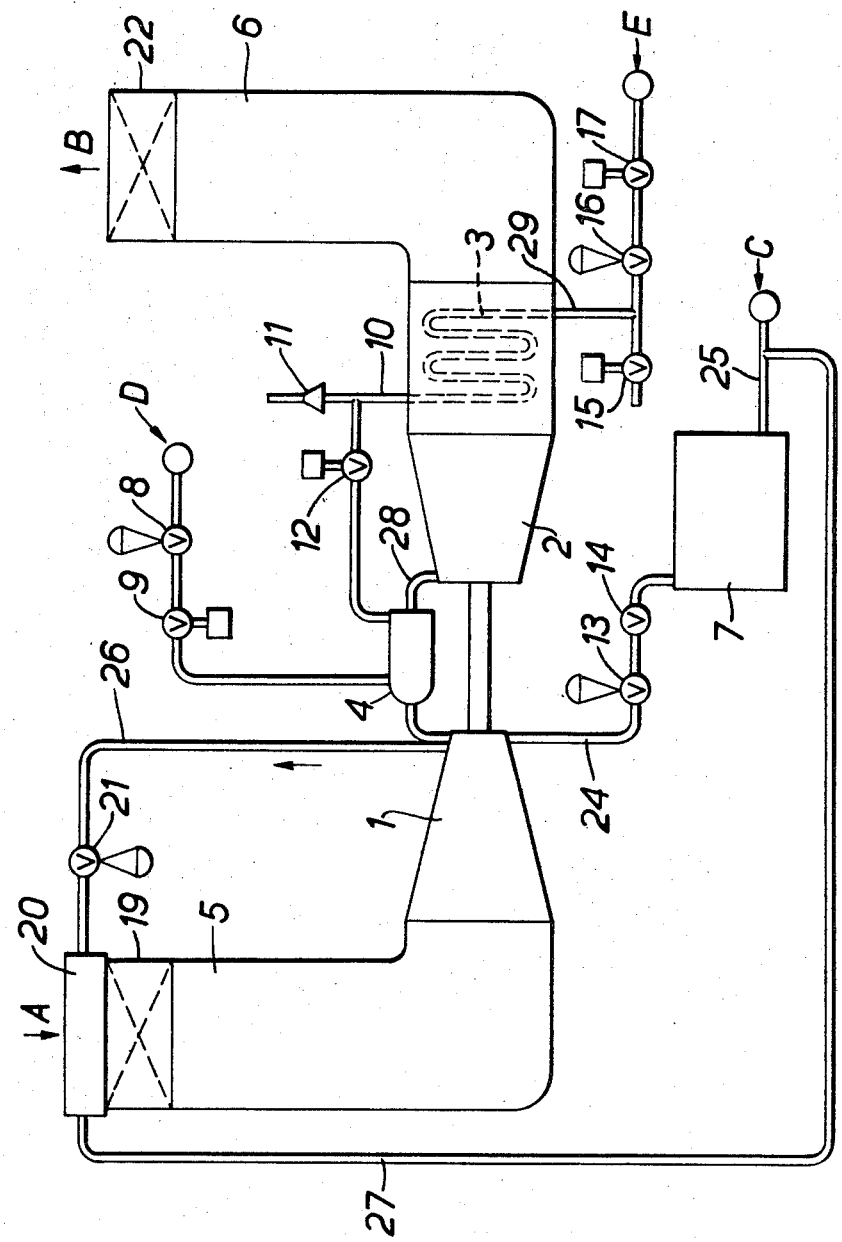

JET ENGINE AIR COMPRESSOR

BACKGROUND OF THE INVENTION

Gas turbine jet engines consist of an air compressor driven by a turbine with a combustion chamber in between. The useful work output is normally the pressure of the hot exhaust gas which in the aircraft is expanded to a high velocity in a propelling nozzle. In the aircraft the propulsive thrust is obtained from the reaction of the high velocity rearward directed jet.

When a gas turbine is used to provide rotary shaft work, the pressurized gas is expanded in an additional turbine which drives the rotary shaft. Because a jet engine consists basically of a large air compressor with its driver, its use as a large air compressor to provide a source of compressed air is attractive.

Basically, use as an air compressor involves extraction of more of the gas expansion energy in the turbine to provide the shaft work required to compress the air which is extracted. The extracted compressed air then constitutes the useful power output of the machine. Use of gas turbines as air compressors is practical. However, a gas turbine or jet engine must be modified to operate efficiently this way.

It is normal practice for small quantities of compressed air to be withdrawn from jet engines for operation of aircraft auxiliaries or to start other engines. Extraction of this air reduces the flow through and work done by the jet engine turbine requiring the jet engine to operate hotter. Operating temperatures in gas turbines are limited; therefore, the quantity of air which may be extracted while maintaining normal thrust or power output is ordinarily limited to about 5 percent of the jet engine flow.

When the propelling nozzle is removed from a jet engine, the expansion ratio across the compressor driving turbine is increased, thus making more energy available for compressing air, but reducing the propulsive power which in a stationary application is not required.

To permit extraction of larger quantities of air from a jet engine, the propulsion nozzle should be removed, permitting full expansion of the exhaust in the compressor driving turbine. Although the additional expansion will occur at reduced efficiency, the power output of the turbine is increased, permitting a substantial portion of the air flow to be extracted from the compressor without exceeding normal temperatures. With a simple system as described above, the pressure at which the air can be extracted is appreciably less than the normal operating pressure of the engine and this is not satisfactory in many applications. The depreciation of pressure is due to the reduced flow through the turbine, which produces less resistance to flow and requires a lower compressor discharge pressure.

One solution would be to modify the turbine to a smaller flow, but this can be expensive and there is a practical limit to the size reduction possible. This modification also makes the engine difficult to start. The solution of this invention is to inject superheated steam into the turbine inlet to restore the volume flow through the turbine to approximately equal the normal flow, thus restoring pressure to approximately normal.

SUMMARY OF THE INVENTION

The first modification of a jet engine according to this invention is to remove the propulsion nozzle to increase the expansion ratio across the driving turbine. Additional modifications would then consist of a manifold for extraction of the compressed air from the compressor discharge and a second manifold for injection of the superheated steam into the downstream end of the combustion chamber, where it would substitute for some of the dilution air and mix with the combustion products before entry to the turbine. These modifications would not affect normal operation of the engine and would permit normal starting and shut down.

The steam for injection will be raised by the heat in the exhaust of the jet engine in a boiler into which the jet engine exhausts, thus recovering the heat and improving the overall efficiency.

Several criteria need to be satisfied in the injection of steam and extraction of air from a jet engine. Usually the most important criteria will be to maintain pressure by replacement of the air which is extracted and does not flow through the turbine. Flow through the turbine nozzles is at sonic velocity, thus the first consideration is a comparison of the speed of sound in air and steam. The speed of sound is proportional to $\sqrt{\gamma/MW}$ where $\gamma$ is the ratio of specific heats at constant pressure and at constant volume and MW is molecular weight.

TABLE I

Sonic Velocity = $\sqrt{\gamma R g T}$
Where: $\gamma$ = cp/cv Variable
R = 1544/Mol.Wt Constant
g = 32.2 ft/sec² constant
t = absolute temp. °R Variable Sonic velocity at a given temperature $\alpha$ $\sqrt{\gamma/Mol.Wt}$

| | AIR | STEAM |
|---|---|---|
| $\gamma$ at 2000°R | 1.325 | 1.242 |
| Mol.Wt | 29 | 18 |
| $\gamma$/Mol.Wt | 1/21.8 | 1/14.5 |
| $\sqrt{\gamma/Mol.Wt}$ | 1/4.67 = .214 | 1/3.81 = .262 |
| Relative sonic velocity % | 100 | 123 |
| Relative density | 100 | 62.1 |
| Relative sonic mass flow % | 100 | 62.1 × 123/100 = 76.2 |

As shown on Table I, above, for a typical turbine inlet temperature of 2,000° = 1,540° F sonic velocity for steam is 123 percent of that for air. Thus, to displace air, the steam volume flow required will be 123 percent of the air volume displaced. The molecular weight of air is 29 and of steam 18, thus steam weights 18/29 or 62 percent of air for the same volume, thus steam to displace air in a turbine is 62 percent of 123 percent = 76.2 percent by weight.

It is necessary for the steam air mixture expanding through the turbine to develop sufficient power to drive the compressor. The power generated by the 76.2 percent by weight of steam will be considered.

TABLE II

Expansion Comparison Air and Steam

Expansion Ratio, 6

Inlet Temperature, 2000°R 1540°F

Adiabatic Efficiency, 80%

| | AIR | STEAM |
|---|---|---|
| $\gamma$ at 1750°R | 1.335 | 1.255 |
| $\gamma-1/\gamma = n$ | .251 | .206 |
| $R^n$ | 1.568 | 1.446 |
| $R^{-n}$ | .638 | .692 |
| $1-R^{-n}$ | .362 | .308 |
| Temp.drop°F=$(1-R^{-n}) T_{1_q}$ | 579 | 493 (85%) |
| Exhaust temp. °F | 961 | 1047 |
| Enthalpy at 1540°F | 505 | 1822 |
| Enthalpy at exhaust | 348 | 1557 |
| Work Btu/lb | 157 | 265 (169%) |

The steps in calculating the work done in an expansion are presented on Table II. Typical conditions for the expander of a gas turbine jet engine are presented. It will be noted that the temperature drop of the steam is 85 percent that of air however, the specific heat of steam is almost double air so the enthalpy change through the turbine is higher than for air (169 percent).

The relative power developed by air and the steam to just replace it is the product of the relative values of sonic velocity, density, temperature drop and specific heat as in Table III. As shown on the table, steam to replace air will product 29 percent more power than the displaced air would produce.

TABLE III

Overall Turbine Performance Comparison Air and Steam

| Inlet temperature | 1540°F |
| Expansion ratio | 6 |
| Efficiency | 80% |

Values for Steam as % of Air

| Sonic velocity | V | 123 |
|---|---|---|
| Density | $\epsilon$ | 62.1 |
| Temperature drop | $\Delta T$ | 85 |
| Specific heat | cp | 197.5 |
| Weight flow | $V\epsilon$ | 76.2 |
| Work per lb | $\Delta T \times cp$ | 169 |
| Power output | $V.\epsilon.\Delta T, cp.$ | 129 |

The implication is that each pound of injected steam will displace 100/76.2 = 1.31 lbs of air and will provide power to compress 1.69 lb of air for extraction.

Alternately, if only 1.31 lbs of air are extracted per lb of steam, thus just matching turbine flow, the modified jet engine will operate cooler with steam injection and balancing extraction flow than without.

As explained previously, when a jet engine is operated statically such that no propulsion is required, the propelling nozzle may be removed, thus permitting the full pressure differential generated by the compressor to be applied across the expander with the exception of minor pressure losses.

When operated this way the expander pressure ratio is in excess of design value, thus efficiency will likely be lower than normal. In spite of the lower efficiency the expander will produce more power at the same inlet temperature or the same power at lower temperature.

If the temperature is permitted to drop in this way, the pressures in the engine will also fall thus reducing possible air extraction pressures, thus it may be desirable to take steps to raise engine temperatures merely to hold pressure at the extraction ports. One possible method is to increase back pressure on the turbine by use of a restriction like a propelling nozzle.

Alternately, the increase in power possible when the pressure differential across the turbine is increased, permits the power to drive the compressor to be developed with reduced flow through the expander. Any reduction in expander flow becomes available as additional extraction flow. A flow reduction through the expander is accomplished at high efficiency and unreduced pressure by substitution of smaller area turbine nozzles for the standard nozzles.

If the compression ratio of the standard engine is in excess of the required extraction air pressure ratio, a similar effect can be obtained by omitting the last stage or stages of the axial flow compressor. This modification reduces the pressure leaving the compressor without reducing weight flow. At the reduced pressure the turbine is unable to swallow all the compressor flow leaving a surplus for extraction but as pointed out previously, at a pressure reduced from the normal jet engine pressure.

It was earlier discussed that it may be desirable to impose back pressure on an expander to increase temperatures in the engine to hold pressure. The same effect of temperature increase and maintenance of pressure can be obtained coupled with an increase in bleed flow if the additional pressure drop is inserted upstream of the turbine nozzles, but downstream of the air extraction ports. For example, as an increase in pressure drop through the combustor liners.

Extraction air obtained by these engine modifications is additive to air obtained by steam injection. Cumulatively 50 percent of the compressor flow may be extracted. One possible system is described hereafter which would employ a jet engine modified only by provision of steam injection manifolds and air bleed manifolds. Other engine modifications like removal of compressor stages, reduced area turbine nozzles or increased pressure drop combustion chambers are not the subject matter of this patent application.

The jet engine for the application described hereafter would be in the 13,000 lb thrust class with an air flow of about 200 lb.second and a compression ratio of about 10. Other sizes can of course be utilized.

The jet turbine would be mounted on a structural steel base along with auxiliary equipment such as the control panel, intake and exhaust plenums, and bleed air system. Optional silencing equipment would be mounted at the site.

An essential feature of the set would be the steam injection system to replace the compressed air withdrawn from the jet engine. The steam would be raised by the heat in the exhaust of the jet engine, which would otherwise be wasted. Steam injection would increase the compressed air output and efficiency of the set five times compared to no steam injection. The steam boiler would require a supply of 150 psig water. The steam coil would effect some silencing, and an exhaust silencer might not be necessary even in a noise sensitive site.

BRIEF DESCRIPTION OF THE DRAWING

The FIGURE is a schematic diagram of a gas turbine jet engine modified according to this invention to provide an air compressor.

DESCRIPTION OF THE PREFERRED EMBODIMENT

Referring to the drawing in detail, inlet air indicated by arrow A passes through a deicer 20 and an inlet silencer 19 if desired. Inlet air duct 5 leads to the engine compressor stage 1 of a gas turbine jet engine. Shaft 23 connects the compressor stage 1 with the power turbine 2 in the conventional manner. Compressed air from compressor 1 passes through combustion chamber 4 to burn natural gas therein before expanding in power turbine 2. Natural gas enters at D passing through an emergency fuel shutoff valve 8 and a governor fuel valve 9 which may be controlled by the exhaust temperature and the speed of shaft 23. Compressed air is bled through line 24 from compressor 1 through air bleed control valve 13 and air bleed shutoff valve 14 to an air to air indirect heat exchanger 7. Valve 13 may be controlled by the exhaust gas temperature. Compressed air is delivered through line 25 to compressed air outlet C. Small quantities of air may be bled from compressor 1 through line 26 controlled by valve 21 which is responsive to the inlet air temperature to heat inlet air passing through deicer 20. The cooled deicing air passes from deicer 20 through line 27 to be added to the compressed air at the outlet C.

Hot gases leaving power turbine 2 pass through outlet duct 6 and exhaust silencer 22. Outlet duct 6 contains the steam coils 3 fed from water inlet E at 150 psi through water shutoff valve 17, steam control valve 16, and line 29. A steam coil blowdown valve 15 is provided. Steam generated in coils 3 passes through steam injection line 10 past safety valve 11 and steam control and shutoff valve 12 to enter the end of combustion chamber 12 and mix in line 28 with hot products of combustion. Exhaust gases leave the silencer 22 as indicated by arrow B.

Operation of the above described equipment is simple and automatic with the fail-safe shutdown equipment and controls described. The gas turbine jet engine is started, run up, and stopped as an ordinary jet engine without withdrawing air from line 24 or injecting steam from line 10.

After the engine attains full speed and is under control of governor 9, valve 13 is opened to bleed air. As the flow of compressed air increases through line 24, more fuel is required by the jet to maintain a constant governed speed and the operating temperature tends to rise. Valve 13 is controlled by exhaust temperature to limit the air bleed to prevent over temperature of the engine by excessive air bleed.

Boiler coils 3 are filled when the jet engine is at speed by the opening of valve 16. As water flows into the simple tube coil boiler 3, it flashes into steam to mix with combustion products in combustion chamber 4 and flow through turbine 2 augmenting the reduced turbine flow resulting from air bleed. This helps power the axial compressor 1 to permit additional air to be bled.

The system operates unattended, with speed controlled by the speed governor 9 and with extraction flow controlled by the requirements for compressed air within the limitation of jet engine temperature control. Normal shutdown involves first turning off the water to the boiler 3 by means of valve 16, and after a short time delay to dry out the boiler 3, the bleed air block valve 14 is closed. The jet is then throttled back to idle speed and stopped by shut off of the fuel valve 8 and automatic simultaneous blowing down of the boiler coil 3 with valve 15. Emergency shutdown, which occurs on any equipment malfunction or by manual operation of a panic button, simultaneously shuts off the water supply valve 17, blows down the boiler coil by opening valve 15 and closes the compressed air block valve 14. Remote automatic startup or shutdown is accomplished at a small increase in complexity.

The boiler 3 described above is a once through design and accumulates hardness deposits during operation. These are removed by chemical treatment once per year or as found necessary. Alternately a drum designed with a blowdown system could be supplied to prevent accumulation of hardness deposits. The exhaust temperature from the jet should not exceed about 900° F, thus, no harm occurs to the boiler by dry operation.

If operated in foggy conditions at close to 32° F, the gas turbine air intake 5 accumulates ice with danger of compressor damage. If the equipment is to be operated in these conditions, an intake air heater 20 to elevate the intake temperature above freezing is required. Air heater 20 heats intake air by means of a part of the compressed air bleed which passes through line 26 in the manner which has been described.

Performance and characteristics of the invention are shown below:

| | |
|---|---|
| Compressed air flow-scfm at 14.6 psia & 60°F | 36,000 |
| Compressed air flow-lb/hr | 165,000 |
| Compressed air flow-discharge pressure-psig | 110 |
| Compressed air flow-discharge tempuerature-°F | 540° |
| Estimated fuel consumption-Btu/hr $\times 10^6$ (LHV) | 138 |
| Approximate skid dimensions | 7 ft × 30 ft |
| Height of unit without silencers | 7 ft, 8 in. |

This invention is particularly useful in providing a source of compressed air for operating snow making machines at ski areas.

What is claimed is:

1. A gas turbine jet engine for sole use as a source of compressed air comprising, in combination, a gas turbine jet engine having a compressor, a power turbine driving said compressor, a combustion chamber, means introducing fuel into said combustion chamber, means conducting compressed air from said compressor to said combustion chamber to burn fuel introduced therein, means conducting products of combustion to said power turbine to expand therein driving said power turbine; an air bleed drawing compressed air from said compressor providing the source of compressed air, an exhaust duct leading from said power turbine, boiler means in said exhaust duct, means introducing water into said boiler means, means conducting steam from said boiler means to said combustion chamber to mix with products of combustion entering said power turbine, said steam restoring volume flow through said power turbine lost by air drawn from said compressor by said air bleed, a governor fuel valve regulating the amount of fuel introduced into said combustion chamber according to the speed of said jet engine and according to the temperature of exhaust gases in said exhaust duct, an air bleed control valve controlling the amount of air bled from said compressor according to the temperature of exhaust gases in said exhaust duct, a steam control valve controlling the amount of water introduced into said boiler means according to the temperature of steam conducted from said boiler means, an inlet deicer, an air bleed line conducting air from said compressor to said deicer, a return line conducting cooled air from said deicer to be mixed with air from said air bleed, and an inlet air deicer control valve in said air bleed line regulating air conducted through said air bleed line to said deicer according to inlet air temperature.

* * * * *